United States Patent [19]
Matsuhira

[11] Patent Number: 6,005,652
[45] Date of Patent: Dec. 21, 1999

[54] LIQUID CRYSTAL DISPLAY DEVICE HAVING INTEGRATED CIRCUIT DISPOSED BETWEEN PANEL AND FILM SUBSTRATE

[75] Inventor: Tsutomu Matsuhira, Chiba, Japan

[73] Assignee: Seiko Instruments Inc., Japan

[21] Appl. No.: 08/616,436

[22] Filed: Mar. 15, 1996

[51] Int. Cl.[6] .................................................. G02F 1/1345
[52] U.S. Cl. .......................... 349/149; 349/150; 349/151
[58] Field of Search ................................... 349/149, 150, 349/151, 152

[56] References Cited

U.S. PATENT DOCUMENTS

| 5,117,300 | 5/1992 | Weimer | 359/88 |
| 5,670,994 | 9/1997 | Kawaguchi et al. | 349/150 |
| 5,737,272 | 4/1998 | Uchiyama et al. | 349/150 |

FOREIGN PATENT DOCUMENTS

| 567209A2 | 10/1993 | European Pat. Off. . |
| 645663A1 | 3/1995 | European Pat. Off. . |

OTHER PUBLICATIONS

Patent Abstracts of Japan, vol. 017, No. 344 (E–1390), Jun. 29, 1993.

Primary Examiner—James A. Dudek
Attorney, Agent, or Firm—Adams & Wilks

[57] ABSTRACT

A liquid crystal display device comprises a panel containing a liquid crystal and having an input wiring formed thereon. A film substrate is disposed over the panel and has wiring lines connected to the input wiring of the panel. At least one integrated circuit is disposed between the panel and the film substrate and has an input terminal connected to the input wiring of the panel for driving the liquid crystal.

24 Claims, 9 Drawing Sheets

LIQUID CRYSTAL DISPLAY DEVICE HAVING INTEGRATED CIRCUIT DISPOSED BETWEEN PANEL AND FILM SUBSTRATE

BACKGROUND OF THE INVENTION

The present invention relates to a liquid crystal display device used for a display screen in a word processor, a notebook computer, a portable equipment or a device.

In recent years, there have been manufactured a number of liquid crystal display devices as portable, thin and low electric consumption type display devices. As a method for mounting these products, there have been produced a system using zebra rubber, a system using a heat seal and a TAB system with a liquid crystal driving driver mounted on a film substrate in large numbers. Because of a strong request for reducing costs, however, a COG mounting system for directly mounting ICs on a liquid crystal panel has begun to be mainly used. As a method for mounting ICs on a glass substrate, there are available methods using an anisotropic conductive film, Ag paste, a contractile resin, etc. An electric signal is supplied to an IC connected to a glass substrate by using a film substrate, but in a liquid crystal display device with two or more ICs mounted on at least a side thereof, as described in Japanese Unexamined Patent Publications Nos. 4-184322 and 6-75240, a projected electrode was formed on the film substrate by means of printing or plating and connected to an input wiring formed on the glass substrate. Otherwise, input wirings for ICs were continuously formed in an external direction without any changes and a film substrate having two surface wirings was connected thereto.

In the liquid crystal display device disclosed in Unexamined Patent Publication No. 4-184322 or 6-75240, it was necessary to make an external dimension of the liquid crystal panel larger by an amount equivalent to a width of FPC. It is difficult to make a wiring width of an FPC electrode finer because of noises and connection accuracy with the liquid crystal panel and though the number of wirings depend on specifications of a driver IC, the external dimension of the liquid crystal panel cannot be reduced without reducing the number of signals input to the driver IC. Because of these reasons, it was difficult to reduce the external dimension of the liquid crystal display device. Also, since it was necessary to give special treatments to the film substrate, prices of the film substrates small in mass-produced number remained high, making it difficult to reduce costs as a liquid crystal display device. In the system using the two-surface wiring film substrate, since it was necessary to have processes for bending FPC after being connected and fixing this in a bent state in order to reduce the external dimension of the liquid crystal display device and an end of the external dimension was FPC, it was difficult to hold the liquid crystal display device.

SUMMARY OF THE INVENTION

In order to solve these problems, in a liquid crystal display device composed of at least a liquid crystal panel, a driver IC and a film substrate, an electrode constituting a pixel of the liquid crystal panel is connected to an output terminal of the driver IC and an input terminal of the driver IC is connected to an input wiring formed on a transparent board. The input wiring is divided into two terminal groups and a connection terminal is formed by disposing a pattern in a side of the driver IC without crossing this, thereby reducing an external size of the liquid crystal panel. In the liquid crystal panel to which the driver IC is connected, a general one-surface wiring or a two-surface wiring not needing special treatments is connected to the connection terminal. This connection is carried out by using an anisotropic conductive film. If the connection terminal of the liquid crystal panel has been given a nickel or gold plating treatment, this may be soldered.

DETAILED DESCRIPTION OF THE PREFERRED EMBODIMENTS

As for a resistance value of a transparent electrode used for the liquid crystal panel, image quality may decline due to an increase in a resistance value of the input terminal to the driver integrated circuit (IC) depending on a pat layout of the driver IC, designing of the input terminal of the driver IC and a size of a display screen. But this problem will be solved sooner or later, because there have already been developed techniques for increasing th e resistance of the transparent electrode, inexpensively plating this and forming a conductive film thereon only by means of friction. Two or more driver ICs are mounted on a side of the liquid panel and connection terminals between the adjacent driver ICs are continuously and alternately disposed or adjacently arranged and connected to a one-surface film substrate and thus the number of connection points is reduced.

Furthermore, in order to coat a wiring elect rode on the glass substrate after the film substrate is mounted so as to prevent this from corrosion, a hole is formed between the connection terminals of the film substrate, a moisture resistant resin is poured though this hole and the electrode is cured, making it possible to apply corrosion coating agents thereon.

In the liquid crystal display device having the driver ICs mounted on at least two sides, there was a process for connecting the input terminals of the film substrates therebetween so as to collect these in one spot. However, this connection between the film substrates is omitted without reducing the number of the film substrates by bending a portion so as to connect the film substrate to one side.

The input wiring formed on the liquid crystal panel is connected to two or more IC input terminals by means of at least one of the signal wirings on the film substrate, making it possible to reduce the number of signal wirings on the film substrate.

Therefore, it is possible to make small the external size of the film substrate and large the terminal width thereof if necessary.

As described above, according to the invention, the external dimension of the liquid crystal display device can be made small and the film substrate without needing any special treatments can be used.

Embodiment

[Embodiment 1]

Now, explanation will be made of the preferred embodiments of the invention by referring to the accompanying drawings.

Figure 1:
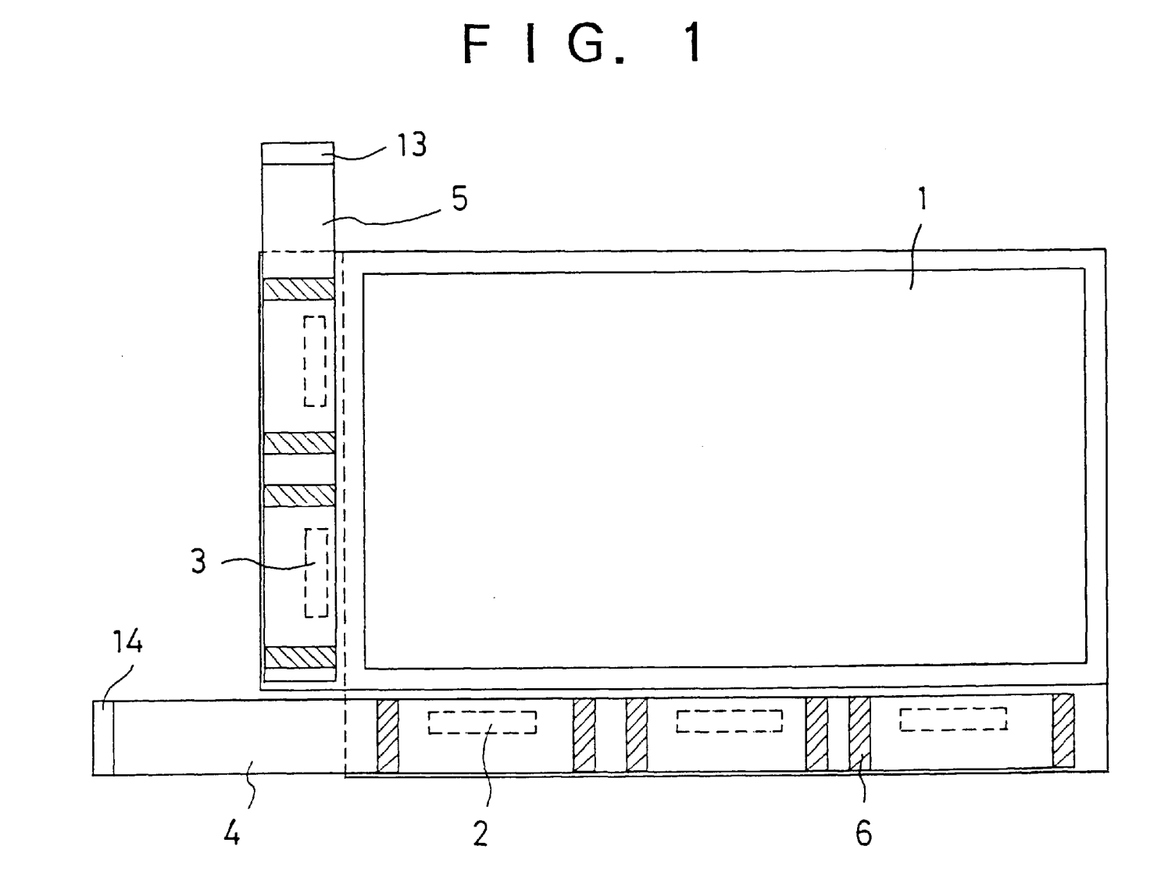
FIG. 1 is a view of an upper surface of a liquid crystal display device of a first embodiment of the invention.
Figure 2:
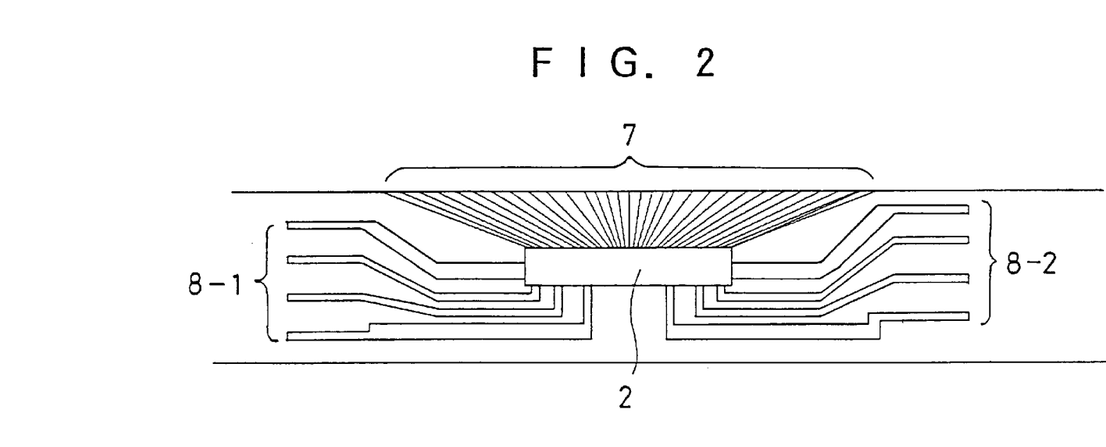
FIG. 2 is a view of an upper surface of a part of the first embodiment on which a driver IC is mounted.
Figure 3:
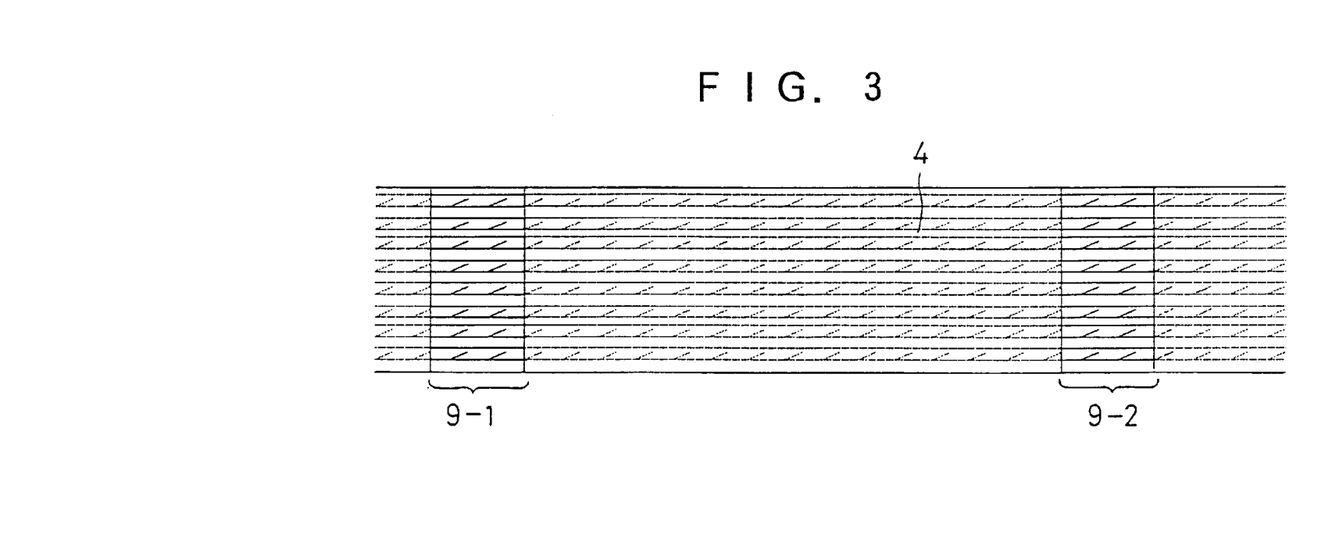
FIG. 3 is a view of an upper surface of a film substrate of the first embodiment.
Figure 4:
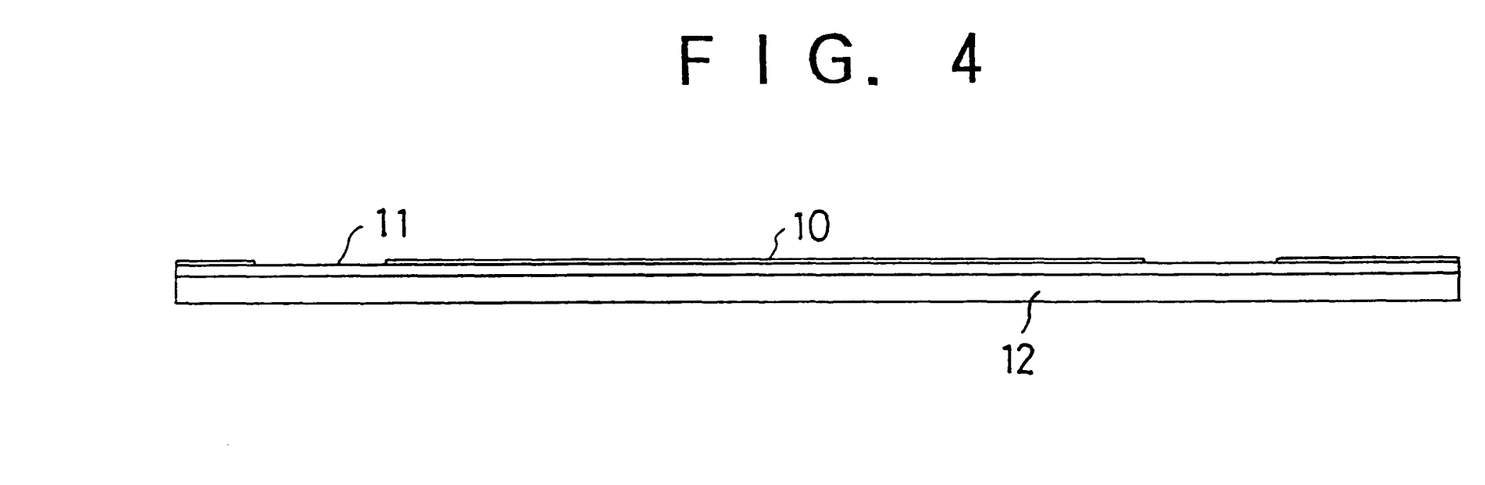
FIG. 4 is a sectional view of the film substrate of the first embodiment.

FIG. 1 shows a structure of a liquid crystal display device of a first embodiment of the invention, FIG. 2 shows a structure of the liquid crystal display device after a driver IC is mounted thereon, FIG. 3 shows an upper surface of a film substrate and FIG. 4 shows a cross section of the film substrate. A segment driver 2 and a common driver 3 are mounted on a liquid crystal panel 1 by temporarily attaching an anisotropic conductive film to a connection surface of each IC and by means of thermocompression. The anisotropic conductive film may be temporarily attached to the liquid crystal panel side. The segment driver IC2 is connected, as shown in FIG. 2, to a liquid crystal display electrode 7 and two separately disposed input terminals 8-1 and 8-2. In a segment film substrate 4, other than connection terminals 9-1 and 9-2 including tolerance connected to the input terminals 8-1 and 8-2, a wiring 11 disposed on a base film 12 is coated with an insulating resist 10 as shown in FIG. 4. An anisotropic conductive film is temporarily attached to a connection surface between the connection terminals 9-1 and 9-2 of the film substrate, these terminals are position-adjusted to the input terminals 8-1 and 8-2 and the film substrate is connected to the panel by means of thermocompression.

The film substrate is connected to the panel being deformed only by an amount equivalent to a height of the IC, but if the film substrate is hard, this is connected thereto by cooling this by air after being press-fitted thermally using a pulse heater and releasing pressure applied to the film. If the film substrate is somewhat soft, this is connected by thermally press-fitting this by means of a press-fitting head having a system for always applying heat. The input terminals 8-1 and 8-2 are connected to each other by means of a terminal of the film substrate without being short-circuited. The common driver and a common film substrate must be connected to the panel in the same way as the segment driver and the segment film substrate. Connection spots between the film substrates 4 and 5 and the liquid crystal panel 1 are shown by hatched parts 6 in FIG. 1. In order to protect an exposed portion of the liquid crystal panel 1, a moisture resistant resin is poured between the film substrates 4 and 5 and the panel through a space so as to cure this portion. In this manner, the liquid crystal display device is completed.

In the liquid crystal display device of the foregoing embodiment, by applying signals to the respective input terminals 13, 14 of the film substrates, a screen thereof is displayed. The electrode mounted on the liquid crystal panel may be ITO itself or a metal plated layer or Ag paste may be formed on ITO so as to obtain good quality images. The driver IC may be one forming a projected electrode on an electrode part or CSP (chip size package) in which a film substrate is connected having almost the same size as an external size of the driver IC and a projected electrode is formed thereon. Connection of the film substrate may be performed by using an anisotropic conductive film, Ag paste, a reinforcing resin or a contractile resin. If the transparent electrode is metal-plated, the IC and the film substrate may be soldered to the panel. By employing such a structure, the external dimension of the liquid crystal display device can be made small and costs of film substrates connected thereto can be reduced.

[Embodiment 2]

Figure 5:
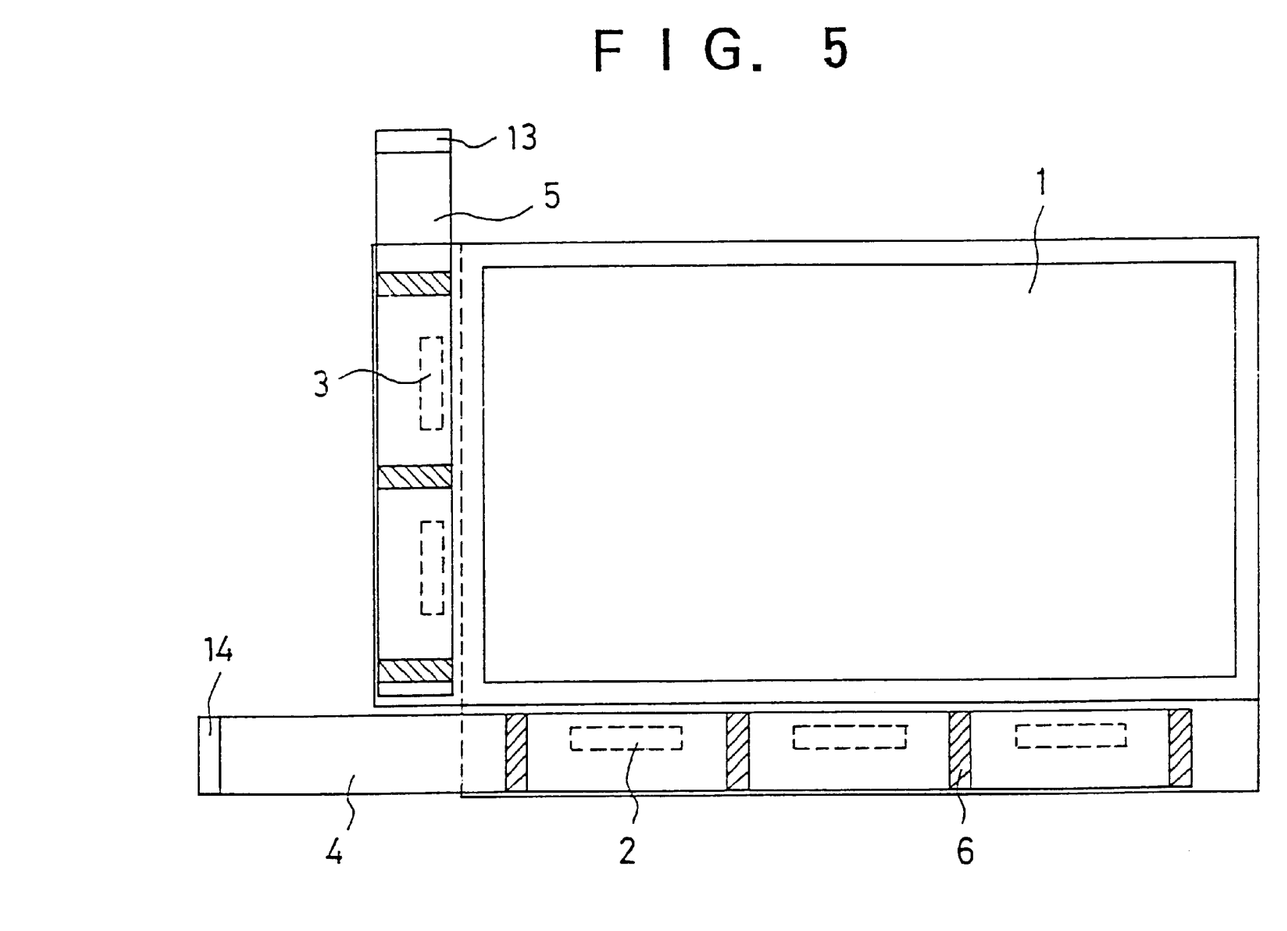
FIG. 5 is a view of an upper surface of a liquid crystal display device of a second embodiment of the invention.
Figure 6:
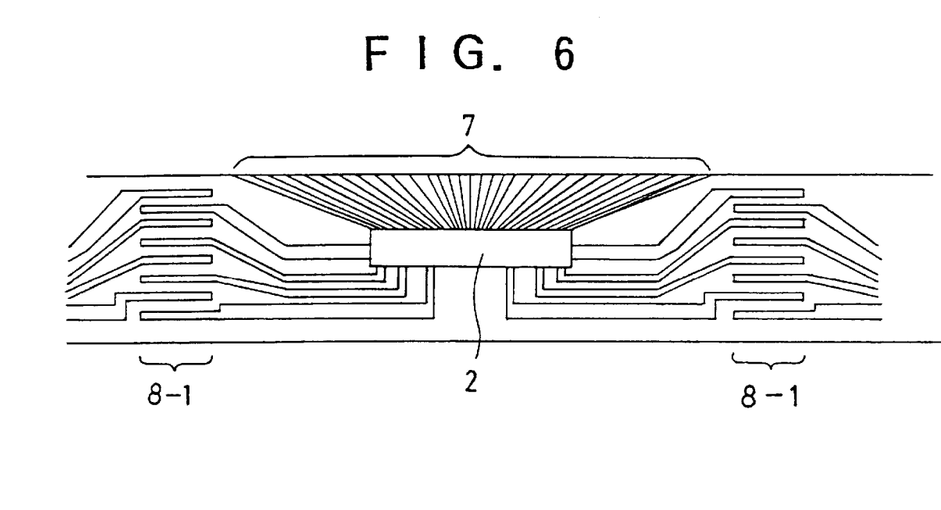
FIG. 6 is a view of an upper surface of a part of the second embodiment on which a driver IC is mounted.
Figure 7:
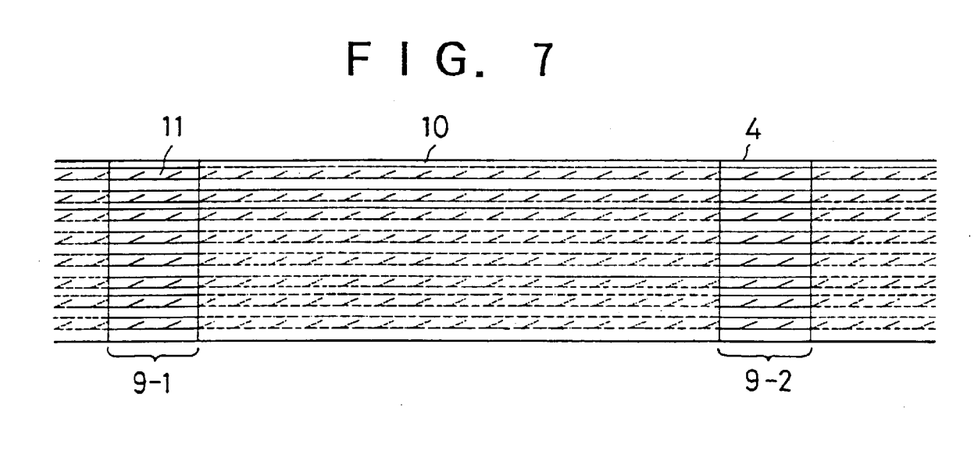
FIG. 7 is a view of an upper surface of a film substrate of the second embodiment.

In a second embodiment of the invention, the number of connection points between film substrates and a liquid crystal panel is reduced. FIG. 5 shows a structure of a liquid crystal display device, FIG. 6 shows a structure of the liquid crystal display device after a driver IC is mounted thereon and FIG. 7 shows an upper surface of the film substrate. A segment driver IC2 and a common driver IC3 are mounted on a liquid crystal panel 1 by temporarily attaching an anisotropic conductive film to each IC connection part by means of thermocompression.

The segment driver IC2 is, as shown in FIG. 6, connected to a liquid crystal display electrode 7 and two separately disposed input terminals 8-1 and 8-2. FIG. 6 shows the segment driver IC positioned in a center in FIG. 5 and input terminals thereof are arranged alternately and continuously with those of the adjacent driver IC. Similarly, the input terminal 8-2 is arranged alternately and continuously with the input terminal 8-1 of the adjacent driver IC. In a segment film substrate 4, as in the case of the first embodiment, other than connection terminals 9-1 and 9-2 including tolerance connected to the input terminals 8-1 and 8-2, a wiring 11 is coated with an insulating resist 10. An anisotropic conductive film is temporarily attached to a connection surface between the connection terminals 9-1 and 9-2 of the film substrate, these terminals are position-adjusted to the input terminals 8-1 and 8-2 and the film substrate is connected to the panel by means of thermocompression. The input terminals 8-1 and 8-2 are connected to each other by means of a terminal of the film substrate without being short-circuited. The common driver and the common driver film substrate must be connected to the panel in the same way as the segment driver and the segment driver film substrate.

Connection spots between the film substrates 5 and 6 and the liquid crystal panel 1 are shown by hatched parts in FIG. 5.

In order to protect an exposed portion of the liquid crystal panel, a moisture resistant resin is poured between the film substrates 4 and 5 and the liquid crystal panel 1 through a space so as to cure this portion. In this manner the liquid crystal display device is completed. In the liquid crystal display device of the embodiment, by applying signals to respective input terminals 13 and 14 of the film substrate, a screen of the liquid crystal display device is displayed. Compared with the first embodiment, the number of connection spots between the film substrates 4 and 5 and the liquid crystal panel 1 can be reduced from 10 to 7.

[Embodiment 3]

Figure 8:
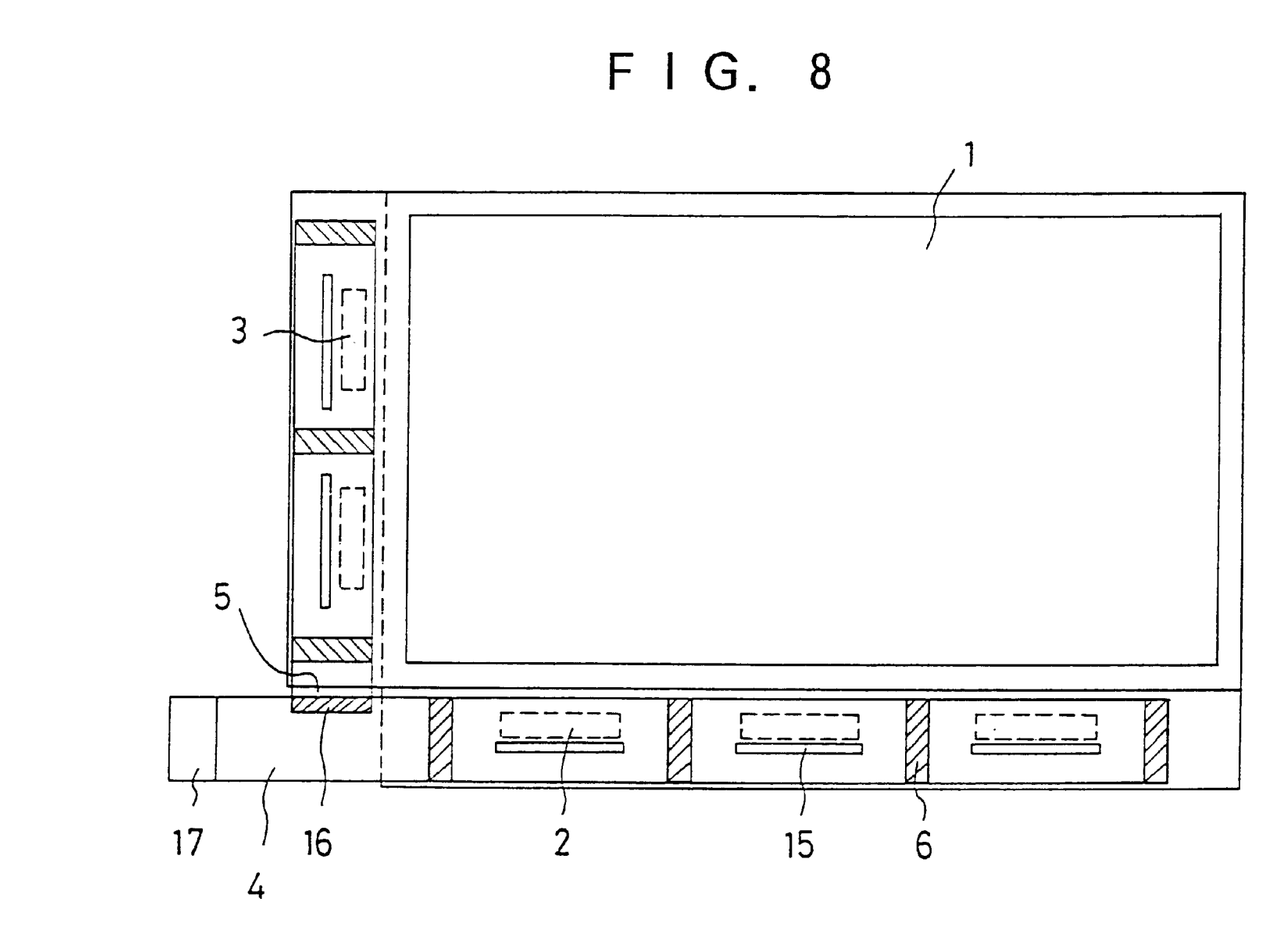
FIG. 8 is a view of an upper surface of a liquid crystal display device of a third embodiment of the invention.
Figure 9:
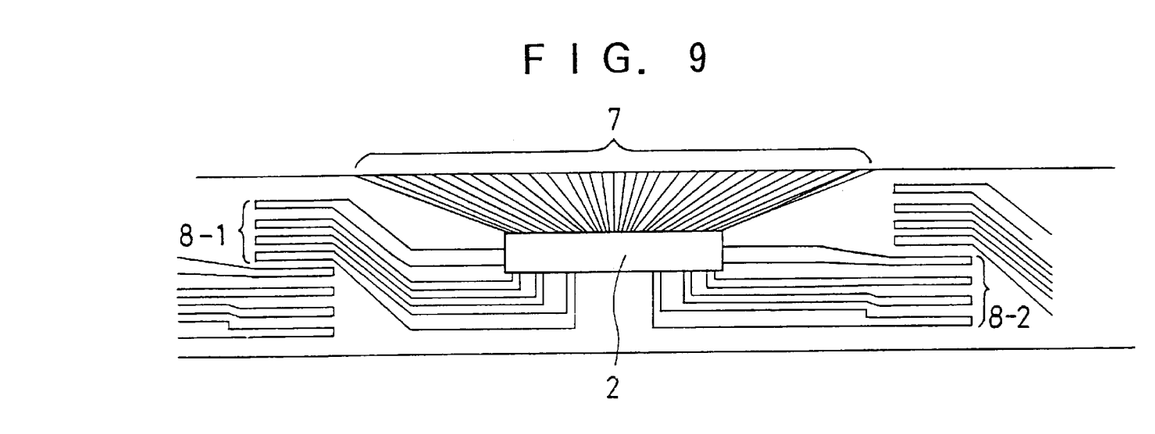
FIG. 9 is a view of an upper surface of a part of the third embodiment on which a driver IC is mounted.
Figure 10:
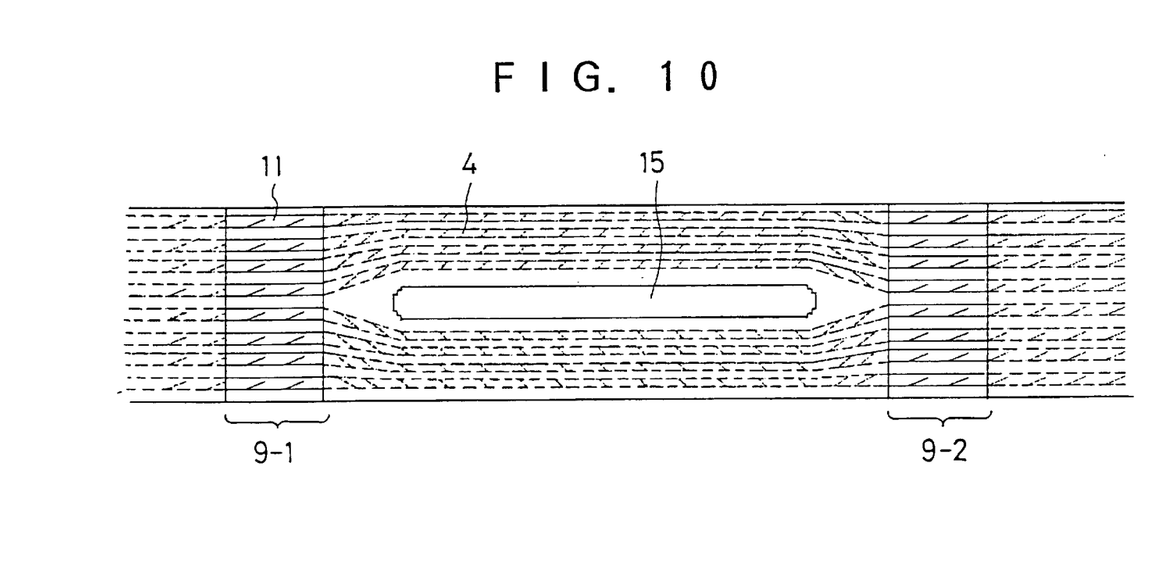
FIG. 10 is a view of an upper surface of a film substrate of a third embodiment of the invention.

In a third embodiment of the invention, coating of a resin for protecting an exposed pattern on a liquid crystal panel between the panel and a film substrate is improved. FIG. 8 shows a structure of a liquid crystal display device, FIG. 9 shows a structure of the liquid crystal display device after a driver IC is mounted thereon and FIG. 10 shows an upper surface of the film substrate. A segment driver IC2 and a common driver IC3 are mounted, by temporarily attaching an anisotropic conductive film to a connection part of each IC, on a liquid crystal panel 1 by means of thermocompression.

The segment driver IC2 is connected, as shown in FIG. 9, to a liquid crystal display electrode 7 and two separately disposed input terminals 8-1 and 8-2. FIG. 9 shows a segment driver IC positioned in the center in FIG. 8 and the input terminal 8-1 is adjacently arranged with the input terminal of the adjacent driver IC. Similarly, the input terminal 8-2 is adjacently arranged with the input terminal of the adjacent driver IC. In a segment film substrate 4, as in the case of the first embodiment, other than connection terminals 9-1 and 9-2 including tolerance connected to the input terminals 8-1 and 8-2, a wiring 11 is coated with an insulating resist 10. The film substrate is, by temporarily attaching an anisotropic conductive film to a connection surface between the connection terminals 9-1 and 9-1 thereof and position-adjusting these to the input terminals 8-1 and 8-2, connected to the panel by means of thermocompression. The input terminals 8-1 and 8-2 are connected to each other by means of the terminal of the film substrate without being short-circuited. The common driver and the common film substrate must be connected to the panel as in the case of the segment driver and the segment film substrate.

Connection spots between the film substrates 4 and 5 and the liquid crystal panel 1 are shown by hatched parts 6 in FIG. 8. In the film substrate 4, a terminal connected to the film substrate 5 is formed in a connection part 16 and wired to an input terminal 17. In the film substrate 5, a terminal connected to the film substrate is also formed in a connection part 16, which connects the film substrates 4 and 5 to each other by means of thermocompression using an anisotropic conductive film. In order to protect an exposed pattern of the liquid crystal panel, a moisture resistant resin is poured between the film substrates 4 and 5 and the liquid crystal display panel 1 through a hole 15 formed on the film substrate, and the resin is then cured. In this manner, crystal display device is completed. In the liquid crystal display device of the foregoing embodiment, displaying is performed by applying electric signals from the input terminal 17.

Compared with the first and second embodiments, coating of a resin for protecting the exposed pattern between the film substrates and the liquid crystal panel is improved.

[Embodiment 4]

Figure 11:
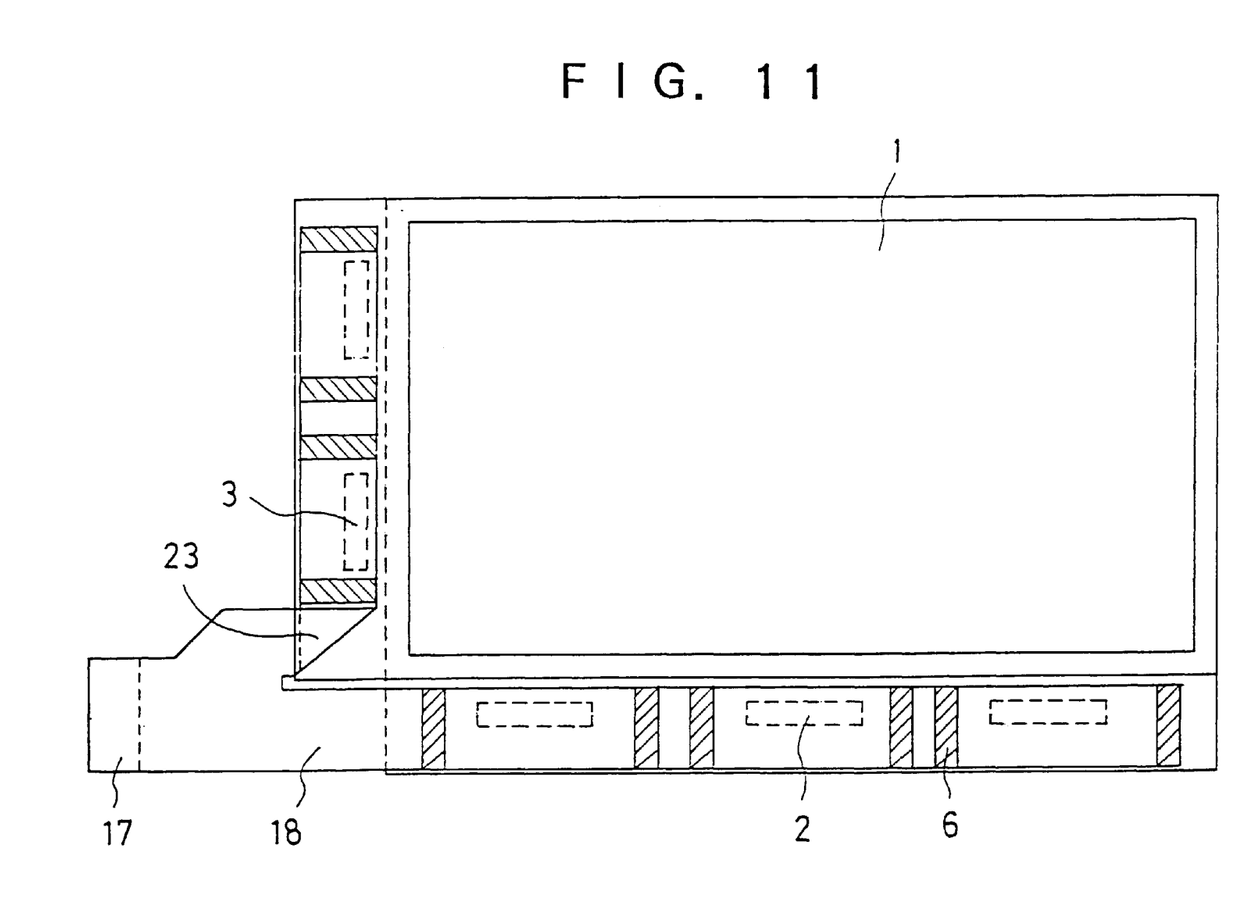
FIG. 11 is a view of an upper surface of a liquid crystal display device of a fourth embodiment of the invention.
Figure 12:
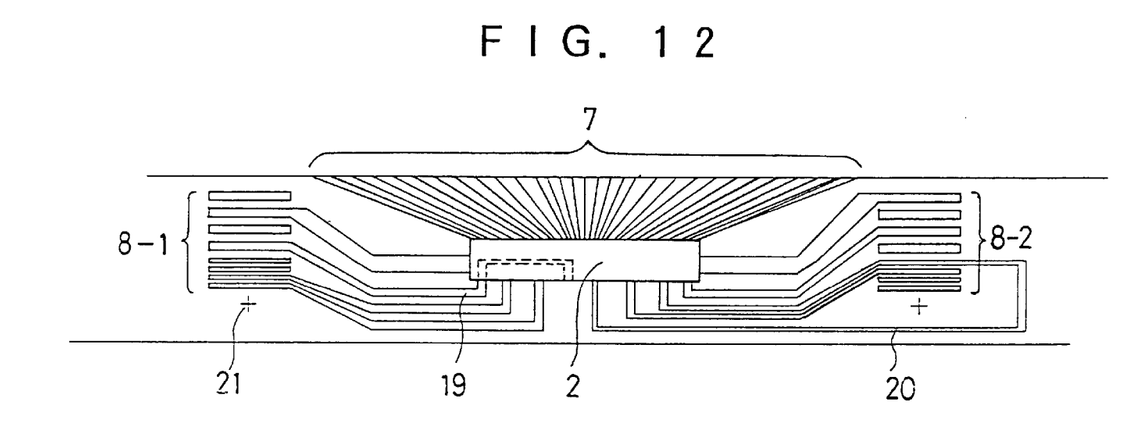
FIG. 12 is a view of an upper surface of a part of the fourth embodiment on which a driver IC is mounted.
Figure 13:
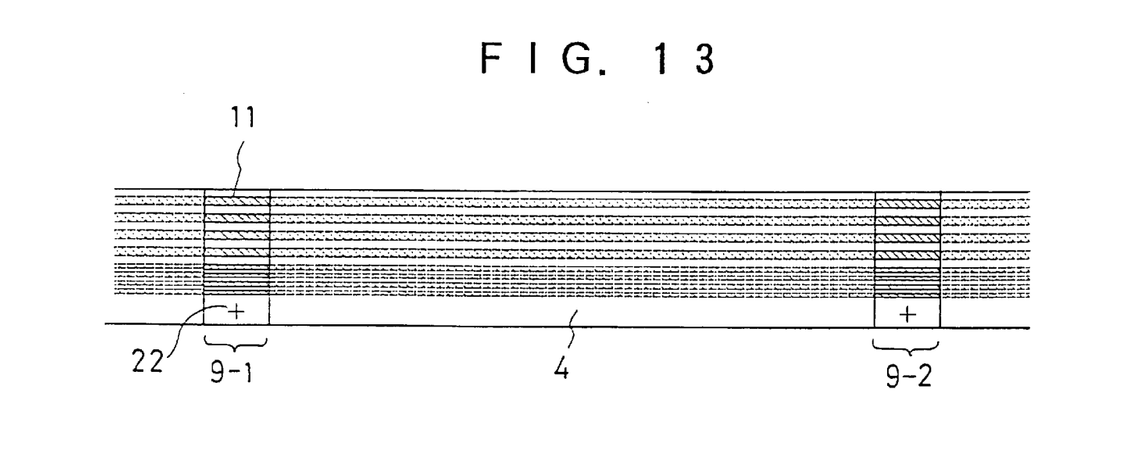
FIG. 13 is a view of an upper surface of a film substrate of the fourth embodiment.

In a fourth embodiment of the invention, the process for performing connection between the film substrates in the third embodiment is eliminated without increasing film costs and the number of electrodes in film substrates connected to ICs mounted on a liquid crystal panel is reduced. FIG. 11 shows a structure of a liquid crystal display device, FIG. 12 shows a structure of the liquid crystal display device after a driver IC is mounted thereon and FIG. 13 shows an upper surface of the film substrate.

A segment driver IC2 and a common driver IC3 are, by temporarily attaching an anisotropic conductive film to a connection part of each IC, mounted on a liquid crystal panel 1 by means of thermocompression. The segment driver IC is connected, as shown in FIG. 12, to a liquid crystal display electrode 7 and two separately disposed input terminals 8-1 and 8-2. In a segment film substrate 4, as in the case of the first embodiment, other than connection terminals 9-1 and 9-2 including tolerance connected to the input terminals, a wiring 11 is coated with an insulating resist 10. Wirings of this film substrate are formed thin for signals and thick for power sources. The film substrate is connected to the panel by temporarily attaching an anisotropic conductive film to a connection surface between the connection terminals 9-1 and 9-2 thereof and position-adjusting a positioning mark 22 formed on the film substrate side and a positioning mark 21 formed on the liquid crystal panel side to the input terminals 8-1 and 8-2 and by means of thermocompression.

The input terminals 8-1 and 8-2 are connected to each other by means of a terminal of the film substrate without being short-circuited and by means of common input wirings 19 and 20 formed on the liquid crystal panel electric signals can be applied to two IC input terminals with one electrode of the film substrate. Connection of the common driver IC must be performed as in the case of the segment driver IC and by bending a bent part 23 of a film substrate 18 the film substrate is connected to the panel as in the case of the segment side. Connection parts between the film substrate 18 and the liquid crystal panel 1 are shown by hatched parts in FIG. 11. In order to protect an exposed pattern of the liquid crystal panel, this portion is cured by pouring a moisture resistant resin between the film substrate 18 and the liquid crystal panel 1. In this manner, the liquid crystal display device is completed. In the liquid crystal display device of the embodiment, displaying is performed by applying electric signals from a signal input terminal 19.

Compared with the first, second and third embodiments, the number of electrodes of the film substrate can be reduced. Also, compared with the third embodiment, the number of connecting processes between FPCs can be reduced without reducing the number thereof.

According to the invention, existing inexpensive film substrates can be used and the external dimension of the liquid crystal display device can be reduced, realizing reduction in costs. A film substrate may be a multi-layer wiring plate such as a double-surface wiring plate and the like. Also, input wiring connection terminals to two ICs separately disposed in one electrode of the film substrate are connected to each other and the same signals can be applied thereto, and it is possible to reduce the number of terminals of the film substrate, that is, the number of the input terminals thereof, depending on combinations between the positions of the connection terminals and those of the terminals of the film substrate. Moreover, the input wiring on the liquid crystal panel may used not only for film terminal connection and connection inside the ICs but also connection of the ICs themselves and even the number of the electrodes on the film substrate may be reduced.

What is claimed is:

1. A liquid crystal display device comprising: a panel containing a liquid crystal and having an input wiring formed thereon; a film substrate disposed over the panel and having a plurality of wiring lines connected to the input wiring of the panel; a first integrated circuit disposed between the panel and the film substrate and having an input terminal connected to the input wiring of the panel for driving the liquid crystal; and a second integrated circuit disposed between the panel and the film substrate and adjacent to the first integrated circuit.

2. A liquid crystal display device according to claim 1; wherein the input wiring of the panel comprises a first plurality of input lines connected to the input terminal of the first integrated circuit and to the wiring lines of the film substrate, and a second plurality of input lines connected to an input terminal of the second integrated circuit and to the wiring lines of the film substrate.

3. A liquid crystal display device according to claim 2; wherein the first plurality of input lines have terminal end portions which alternately overlap terminal end portions of the second plurality of input lines.

4. A liquid crystal display device according to claim 2; wherein the first plurality of input lines have terminal end portions which overlap terminal end portions of the second plurality of input lines.

5. A liquid crystal display device according to claim 1; wherein the input wiring of the panel comprises a pair of terminal groups disposed on opposite sides of the integrated circuit, the terminal groups being connected to the input terminal of the integrated circuit and to the wiring lines of the film substrate.

6. A liquid crystal display device according to claim 1; wherein the film substrate has a bent portion connected to the input wiring of the panel.

7. A liquid crystal display device according to claim 1; wherein the input wiring of the panel comprises a plurality of input terminals; and wherein at least one of the wiring lines of the film substrate is formed on the panel and is connected to two or more of the input terminals.

8. A liquid crystal display device according to claim 1; further comprising an electrode connected to an output terminal of the integrated circuit.

9. A liquid crystal display device according to claim 8; wherein the electrode comprises a display electrode of the panel.

10. A liquid crystal display device comprising: a panel containing a liquid crystal and having an input wiring formed thereon; a film substrate disposed over the panel and having a plurality of wiring lines connected to the input wiring of the panel; and a plurality of integrated circuits disposed on a side of the panel and between the film substrate and the panel, each of the integrated circuits having an input terminal connected to the input wiring of the panel for driving the liquid crystal.

11. A liquid crystal display device comprising: a panel containing a liquid crystal and having an input wiring formed thereon; a film substrate disposed over the panel and having a plurality of wiring lines connected to the input wiring of the panel and a hole disposed between the wiring lines for inserting a moisture resistant resin between the panel and the film substrate; and at least one integrated circuit disposed between the panel and the film substrate and having an input terminal connected to the input wiring of the panel for driving the liquid crystal.

12. A liquid crystal display device comprising: a panel containing a liquid crystal and having an input wiring formed thereon; a film substrate disposed over the panel and having a plurality of wiring lines connected to the input wiring of the panel; a first integrated circuit disposed between the panel and the film substrate and having an input terminal connected to the input wiring of the panel for driving the liquid crystal; wherein the input wiring of the panel is formed on the first and second sides of the panel, the first integrated circuit being mounted on the first side of the panel and having the input terminal connected to the input wiring formed on the first side of the panel; and a second integrated circuit mounted on the second side of the panel and disposed between the panel and the film substrate, the second integrated circuit having an input terminal connected to the input wiring formed on the second side of the panel.

13. A liquid crystal display device according to claim 12; wherein the film substrate has a bent portion connected to the input wiring formed on one of the first and second sides of the panel.

14. An electronic device comprising: a transparent substrate having a plurality of electronic elements mounted thereon and having an input wiring formed thereon; a film substrate disposed over the transparent substrate and having a plurality of wiring lines connected to the input wiring of the transparent substrate; a first integrated circuit disposed between the transparent substrate and the film substrate and having an input terminal connected to the input wiring of the transparent substrate for driving the electronic elements; and a second integrated circuit disposed between the transparent substrate and the film substrate and adjacent to the first integrated circuit.

15. An electronic device according to claim 14; wherein the input wiring of the transparent substrate comprises a first plurality of input lines connected to the input terminal of the first integrated circuit and to the wiring lines of the film substrate, and a second plurality of input lines connected to an input terminal of the second integrated circuit and to the wiring lines of the film substrate.

16. An electronic device according to claim 15; wherein the first plurality of input lines have terminal end portions which alternately overlap terminal end portions of the second plurality of input lines.

17. An electronic device according to claim 15; wherein the first plurality of input lines have terminal end portions which overlap terminal end portions of the second plurality of input lines.

18. An electronic device according to claim 18; wherein the input wiring of the transparent substrate comprises a pair of terminal groups disposed on opposite sides of the integrated circuit, the terminal groups being connected to the input terminal of the integrated circuit and to the wiring lines of the film substrate.

19. An electronic device according to claim 14; wherein the film substrate has a bent portion connected to the input wiring of the transparent substrate.

20. An electronic device according to claim 14; wherein the input wiring of the transparent substrate comprises a plurality of input terminals; and wherein at least one of the wiring lines of the film substrate is formed on the transparent substrate and is connected to two or more of the input terminals.

21. An electronic device comprising: a transparent substrate having a plurality of electronic elements mounted thereon and having an input wiring formed thereon; a film substrate disposed over the transparent substrate and having a plurality of wiring lines connected to the input wiring of the transparent substrate; and a plurality of integrated circuits disposed on a side of the transparent substrate and between the film substrate and the transparent substrate, each of the integrated circuits having an input terminal connected to the input wiring of the transparent substrate for driving the electronic elements.

22. An electronic device comprising: a transparent substrate having a plurality of electronic elements mounted thereon and having an input wiring formed thereon; a film substrate disposed over the transparent substrate and having a plurality of wiring lines connected to the input wiring of the transparent substrate and a hole disposed between the wiring lines for insertion of a moisture resistant substrate between the transparent substrate and the film substrate; and at least one integrated circuit disposed between the transparent substrate and the film substrate and having an input terminal connected to the input wiring of the transparent substrate for driving the electronic elements.

23. An electronic device comprising: a transparent substrate having a plurality of electronic elements mounted thereon and having an input wiring formed thereon; a film substrate disposed over the transparent substrate and having a plurality of wiring lines connected to the input wiring of the transparent substrate; a first integrated circuit disposed between the transparent substrate and the film substrate and having an input terminal connected to the input wiring of the transparent substrate for driving the electronic elements, the first integrated circuit being mounted on the first side of the transparent substrate and having the input terminal connected to the input wiring formed on the first side of the transparent substrate; and a second integrated circuit mounted on the second side of the transparent substrate and disposed between the transparent substrate and the film substrate, the second integrated circuit having an input terminal connected to the input wiring formed on the second side of the transparent substrate.

24. An electronic device according to claim 23; wherein the film substrate has a bent portion connected to the input wiring formed on one of the first and second sides of the transparent substrate.

* * * * *